(12) United States Patent
Guynn et al.

(10) Patent No.: US 7,184,186 B2
(45) Date of Patent: Feb. 27, 2007

(54) OPTICAL SWITCH ASSEMBLY

(75) Inventors: Roy Guynn, Blacksburg, VA (US); Michael L. Smith, Jefferson City, TN (US); John Carberry, Talbott, TN (US); Vincent J. Tekippe, Millersville, MD (US)

(73) Assignee: Neptec Optical Solutions, Inc., Fremont, CA (US)

( * ) Notice: Subject to any disclaimer, the term of this patent is extended or adjusted under 35 U.S.C. 154(b) by 80 days.

(21) Appl. No.: 10/753,607

(22) Filed: Jan. 8, 2004

(65) Prior Publication Data

US 2004/0252937 A1  Dec. 16, 2004

Related U.S. Application Data

(63) Continuation-in-part of application No. 10/217,178, filed on Aug. 12, 2002, now Pat. No. 6,735,006.

(51) Int. Cl.
 *G02B 26/08* (2006.01)
 *G02B 6/26* (2006.01)

(52) U.S. Cl. .................... 359/212; 359/213; 385/16; 385/17; 385/18; 385/33

(58) Field of Classification Search ............... 359/212, 359/213, 214, 223, 226, 204, 291; 385/15–18, 385/33, 34
See application file for complete search history.

(56) References Cited

U.S. PATENT DOCUMENTS

| | | | |
|---|---|---|---|
| 4,057,719 A | 11/1977 | Lewis | |
| 5,133,030 A | 7/1992 | Lee | |
| 5,175,780 A | 12/1992 | Sano et al. | |
| 5,420,946 A | 5/1995 | Tsai | |
| 5,542,013 A | 7/1996 | Kaplow et al. | |
| 5,546,180 A | 8/1996 | Garel-Jones et al. | |
| 5,742,712 A | 4/1998 | Pan et al. | |
| 6,094,293 A | 7/2000 | Yokoyana et al. | |
| 6,259,835 B1 * | 7/2001 | Jing | 385/18 |
| 6,404,942 B1 | 6/2002 | Edwards et al. | |
| 6,430,332 B1 | 8/2002 | Laor et al. | |
| 6,549,691 B1 * | 4/2003 | Street et al. | 385/18 |
| 6,606,429 B1 | 8/2003 | Carberry et al. | |

* cited by examiner

*Primary Examiner*—Ricky Mack
*Assistant Examiner*—Tuyen Tra
(74) *Attorney, Agent, or Firm*—Pitts & Brittian, PC

(57) ABSTRACT

An apparatus for switching optical signals. An optical bench includes a plurality of through-openings for receiving a plurality of collimators and a plurality of actuators. The actuators include a mirror for redirecting an optical signal from one collimator to another. The collimators and actuators are secured to the optical bench by an adhesive system that includes opposing longitudinal slots containing adhesive securing the collimators and actuators to the optical bench.

37 Claims, 11 Drawing Sheets

OPTICAL SWITCH ASSEMBLY

CROSS-REFERENCE TO RELATED APPLICATIONS

This application is a Continuation in Part Application of prior application Ser. No. 10/217,178, filed on Aug. 12, 2002 now U.S. Pat. No. 6,735,006.

STATEMENT REGARDING FEDERALLY SPONSORED RESEARCH OR DEVELOPMENT

Not Applicable

BACKGROUND OF THE INVENTION

1. Field of Invention

This invention pertains to optical switches. More particularly, this invention pertains to an optical switching assembly including an array of optical switches with a spare input available to replace any of the optical inputs in the array and to optical switching assemblies that include 1×N and N×1 switches.

2. Description of the Related Art

Optical signals are transmitted over fiber optic cables. There is a large demand to send optical signals over great distances without sacrificing data integrity. In order to achieve this goal, it is common practice to use repeaters at intermediate distances. Repeaters typically convert the optical signal into an electrical signal and then back into another optical signal, which is sent over the next length of fiber optic cable.

It is desirable to maximize the up-time of fiber optic systems. One common method to achieve maximum up-time is to have spare optical transmitters standing by that can be switched to replace failed transmitters. Typically, there is one spare for each transmitter, which results in a large amount of unused, standby capacity.

Fiber optic cables have a minimum bend radius which is large relative to the cable diameter. Accordingly, routing of fiber optic cables oftentimes determines the size and layout of fiber optic equipment, which is commonly rack mounted with input and output connections accessible from a front panel. In order to accommodate high density requirements, it is desirable to minimize the size of fiber optic equipment.

It is also desirable to minimize attenuation of the optical signals in optical equipment. A factor that affects attenuation is the dimensional stability of the components in the optical equipment. The optical signal from an fiber optic cable has a small size and small changes in alignment, for example, due to changes in temperature, may cause attenuation of the optical signal. Further, it is desirable to operate optical equipment over a wide temperature range, which is at odds with the desire to minimize attenuation.

BRIEF SUMMARY OF THE INVENTION

According to one embodiment of the present invention, an optical switch assembly and method of assembly are provided. The switch assembly has a plurality of optical inputs providing optical signals to a plurality of optical outputs. The switch assembly includes actuators that can switch the optical signal from an optical transmitter to any one of the plurality of optical outputs.

The optical switch assembly includes an optical bench with input and output collimators fixed such that the optical signal is reflected from mirrors from each input collimator to its associated output collimator. In each optical path is an actuator that can redirect an optical signal from a collimator located at one end of the optical bench to the output collimator, thereby replacing a failed input signal with one from a single, spare laser. In another embodiment, the input and output collimators are reversed such that any one input can be switched to a single output collimator.

In another embodiment, the optical switch assembly is a 1×N or N×1 switch. A bank of collimators is positioned along one side of the optical bench and another collimator is positioned at the end of the collimator. By selectively operating one of the bank of actuators, an optical path is formed between the corresponding one of the bank of collimators and the end collimator.

The optical bench has cylindrical holes for receiving the collimators and actuators. The cylindrical holes have slots on opposing walls. The slots allow the introduction of adhesive for securing the collimators and actuators.

The method of actively aligning the collimators and actuators includes attaching the mirrors to the optical bench, positioning a first collimator, aligning the collimator, and curing the adhesive. After the first collimator is aligned and fixed in place, the end collimator is similarly positioned, aligned, and secured. After the first collimator is aligned, the second collimator opposite the first is aligned by sending an optical signal from the first to the second collimator. After the first and second collimators are aligned, the actuator is positioned, aligned, and secured. The actuator mirror is actively aligned by sending an optical signal from the first to the end collimator. The above procedure is repeated for each pair of collimators.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
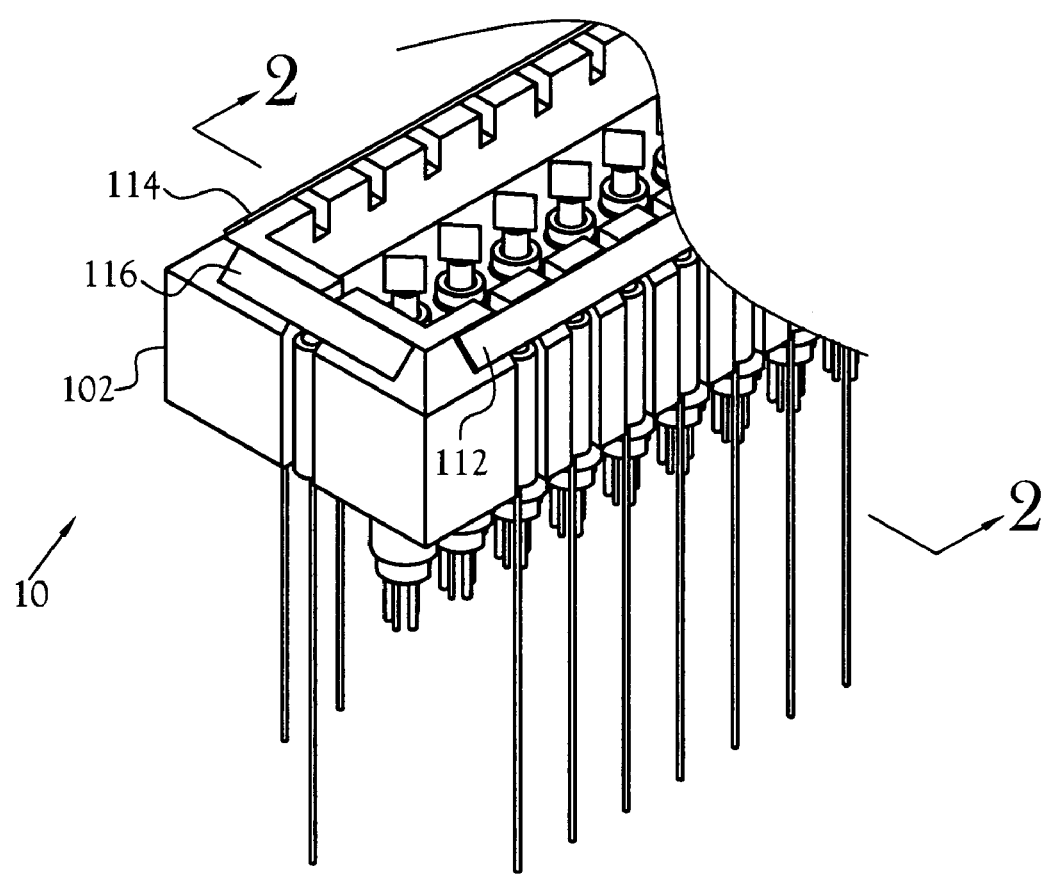
FIG. 1 is a partial perspective view of an optical bench showing the optical collimators and switches.

An apparatus for switching an optical signal is disclosed. FIG. 1 illustrates one embodiment of the optical switch assembly, generally referred to as number 10 in the figures. The switch assembly, or array, 10 includes an optical bench 102 with mirrors 112, 114, and 116 attached.

Figure 2:
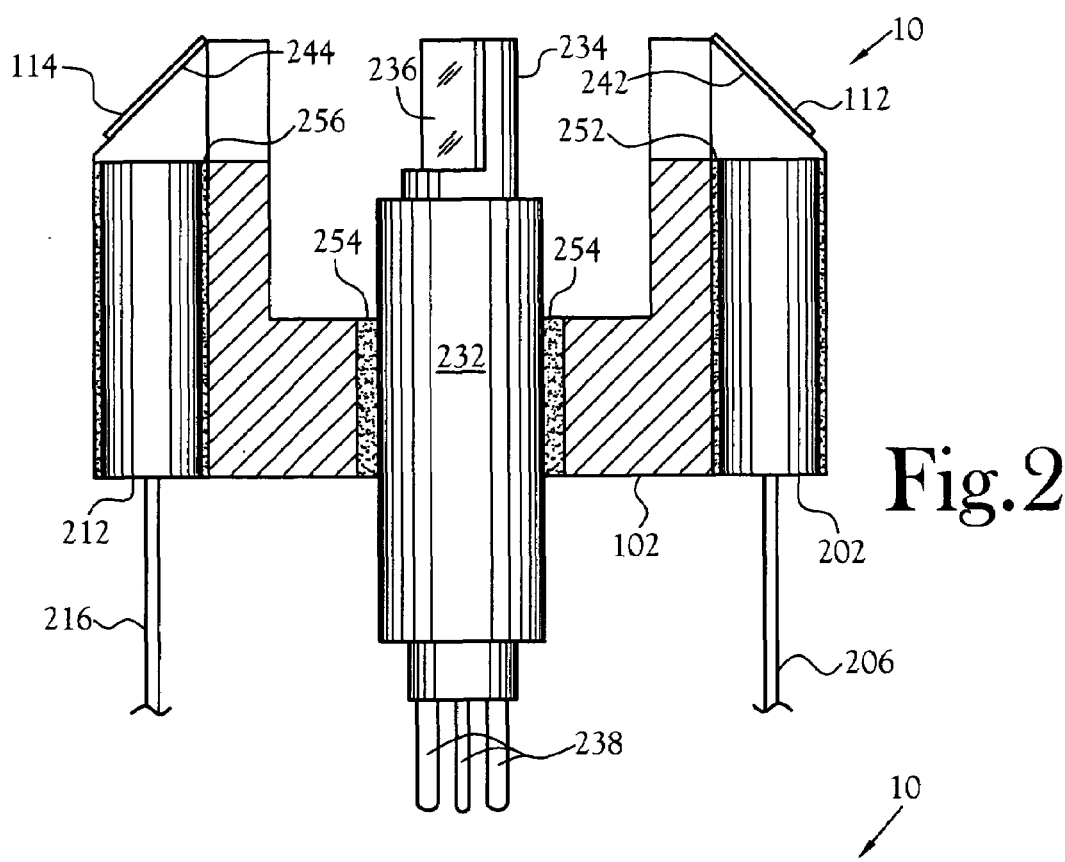
FIG. 2 is a cutaway view of the bench showing the relationship of two collimators and the optical switch.

FIG. 2 illustrates a cutaway view showing the arrangement of an input collimator 202, an actuator 232, and an output collimator 212. The actuator 232 is illustrated in the actuated position with the shuttle 234 and the switch mirror 236 positioned to redirect the optical signal to collimator 212 and mirror 114. The actuator 232 is an optical switch with two positions, one position that redirects an optical signal and another that does not redirect the signal. In the illustrated embodiment, the actuator 232 has three power leads 238 for extending and retracting the shuttle 234 and mirror 236. Also, the illustrated shuttle 234 is a cylinder with an upper portion cut away with the mirror 236 attached to the face of the remaining portion of the cylinder 234. In another embodiment, the mirror 236 is attached to the shuttle 234 having a cone-shaped upper portion.

It is apparent in FIG. 2 that the fiber optic cables 206, 216 connected to the collimators 202, 212 are parallel and adjacent. The arrangement of the fiber optic cables 206, 216 illustrated in FIGS. 1 and 2 permits the cables 206, 216 to be routed similarly to an interface panel containing optical input and output connections.

In one embodiment, the switch assembly 10 has twenty input collimators 202 and twenty output collimators 212, with one end collimator 312 providing a replacement input that can be switched to any of the twenty output collimators 212. This configuration is a 20-by-21 switch. In another embodiment, the switch assembly 10 has twenty input collimators 202 and twenty output collimators 212, with one end collimator 312 serving as an output for any one of the twenty input collimators 202. Those skilled in the art will recognize that the number of input and output collimators 202, 212 can vary without departing from the scope or spirit of the present invention.

Figure 3:
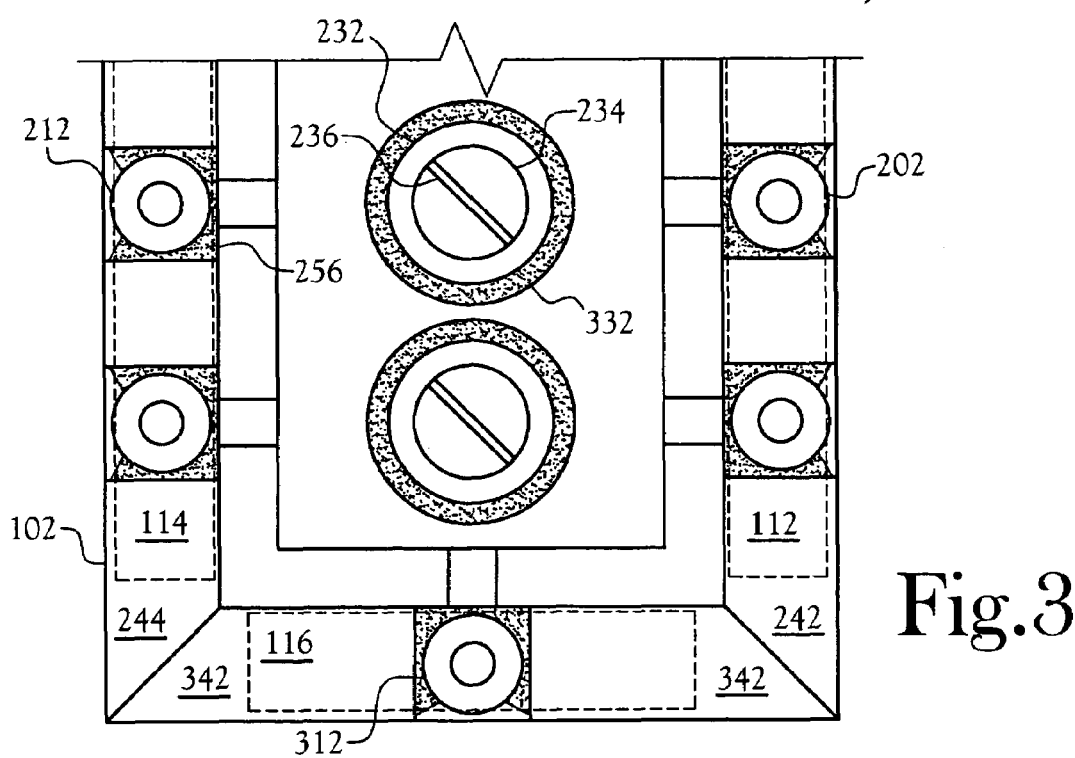
FIG. 3 is a top view of a collimator and two pairs of collimators with their associated switches.

FIG. 3 illustrates a top view of one end of the switch assembly 10. The mirrors 112, 114, and 116 are illustrated in phantom so as to show the collimators 202, 212, 312. The input collimators 202 are a means for accepting optical input signals. The output collimators 212 are a means for transmitting optical output signals. The end collimator 312 is a means for accepting a replacement optical input signal. A means for directing the optical input signals from the collimators 202, 312 to the output collimators 212 include the mirrors 112, 114, 116. The actuators 232 are a means for selectively replacing any one of the optical inputs from the input collimators 202 with the replacement optical input.

The collimators 202, 212, 312 and the switches 232 are secured to the bench 102 by an adhesive 252, 254, 256. The adhesive 252, 256 fills a gap between the collimators 202, 212, 312 and the optical bench 102. The adhesive 254 fills a gap between the actuators 232 and the optical bench 102. The gaps filled by the adhesive 252, 254, 256 permit the collimators 202, 212, 312 and the actuators 232 to be moved relative to the bench 102 during positioning and alignment before the adhesive 252, 254, 256 is cured.

In one embodiment the adhesive 252, 254, 256 is a quick curing adhesive blended with amorphous silica spheres of a selected diameter. The adhesive is compressed between the mirrors 112, 114, and 116 and the optical bench 102, with the spheres forming a monolayer, which results in dimensional stability when the adhesive is cured. In another embodiment the adhesive 252, 254, 256 is Dymax OP66LS, which has a coefficient of thermal expansion similar to that of the bench 102 such that the collimators 202, 212, 312 remain in alignment as the temperature varies within the operating range of the switch assembly 10.

The precise alignment of the collimators 202, 212, 312 to the mirrors 112, 114, 116, 236 is critical in fiber optics. Any misalignment can result in an attenuation of the signal or the loss of the signal. By matching the coefficient of thermal expansion of the individual components and adhesives, the components of the switch assembly 10 remain in alignment over a wide temperature range such that the optical path does not suffer degradation as the temperature varies. In one embodiment, the temperature range is from −40° to +85° Centigrade. In another embodiment, the transition point of the adhesive 252, 254, 256 is outside the operating temperature range, which enhances the dimensional stability of the switch assembly 10. In one embodiment, keeping the transition point outside the operating range is accomplished by using fillers. In still another embodiment, the adhesive 252, 254, 256 has limited shrinkage, which can be accomplished with a filler. Further, the adhesive 252, 254, 256 can be cured in place, which aids in the active alignment of the collimators 202, 212, 312 and actuators 232. In one embodiment the adhesive 252, 254, 256 is cured by ultraviolet light.

The optical bench 102 is in the general shape of a channel with one end closed. That is, the bench 102 has a base with three perpendicular side walls. Spaced along the sides of the bench 102 walls are slots into which the collimators 202, 212, 312 fit with clearance for an adhesive 252, 256. Spaced along the top of the bench 102 walls are slots through which the optical paths travel between the collimators 202, 212, 312 and actuators 232. Those skilled in the art will recognize that the slots can be rectangular as illustrated or of any other shape, such as a V-shaped groove or even a drilled opening, without departing from the spirit and scope of the present invention. The illustrated configuration of the optical bench 102 provides for a short free space distance for the optical signal to travel, which, for fiber optics, minimizes the signal degradation.

The optical bench 102 has chamfers 242, 244, 342 between its side walls and top surfaces. In one embodiment, each chamfer 242, 244, 342 is at a precise 45° angle. Mirrors 112, 114, 116 are reflectors attached to surfaces 242, 244, 342 with a reflective surface positioned to reflect the optical signal from or to the collimator. In one embodiment, the mirrors 112, 114, 116 are front-sided mirrors having a reflective surface on the surface of the mirrors 112, 114, 116 facing the optical bench 102 surfaces 242, 244, 342. The mirrors 112, 114, 116 in one embodiment are glass with a reflective surface. In another embodiment, the mirrors 112, 114, 116 are metal, such as Kovar, with a reflective surface. In one embodiment an adhesive (not illustrated) is used to affix the mirrors 112, 114, 116 to the optical bench 102.

In one embodiment the bench 102 is made of Kovar metal, which has a coefficient of thermal expansion similar to that of glass. The mirrors 112, 114, 116 are fixed to the bench 102 with an adhesive. In one embodiment the adhesive has a coefficient of thermal expansion similar to that of the mirrors 112, 114, 116 and the bench 102. Likewise, the actuators 232 and collimators 202, 212, 312 are fabricated of materials with a coefficient of thermal expansion similar to that of the bench 102. In one embodiment the mirrors 112, 114, 116 are glass plates with a front side reflective coating responsive to the frequencies passed by the collimators 202, 212, 312. In another embodiment, the mirrors are flat plates with a front side reflective coating, and the plates have a coefficient of thermal expansion similar to that of the optical bench 102.

Figure 4:
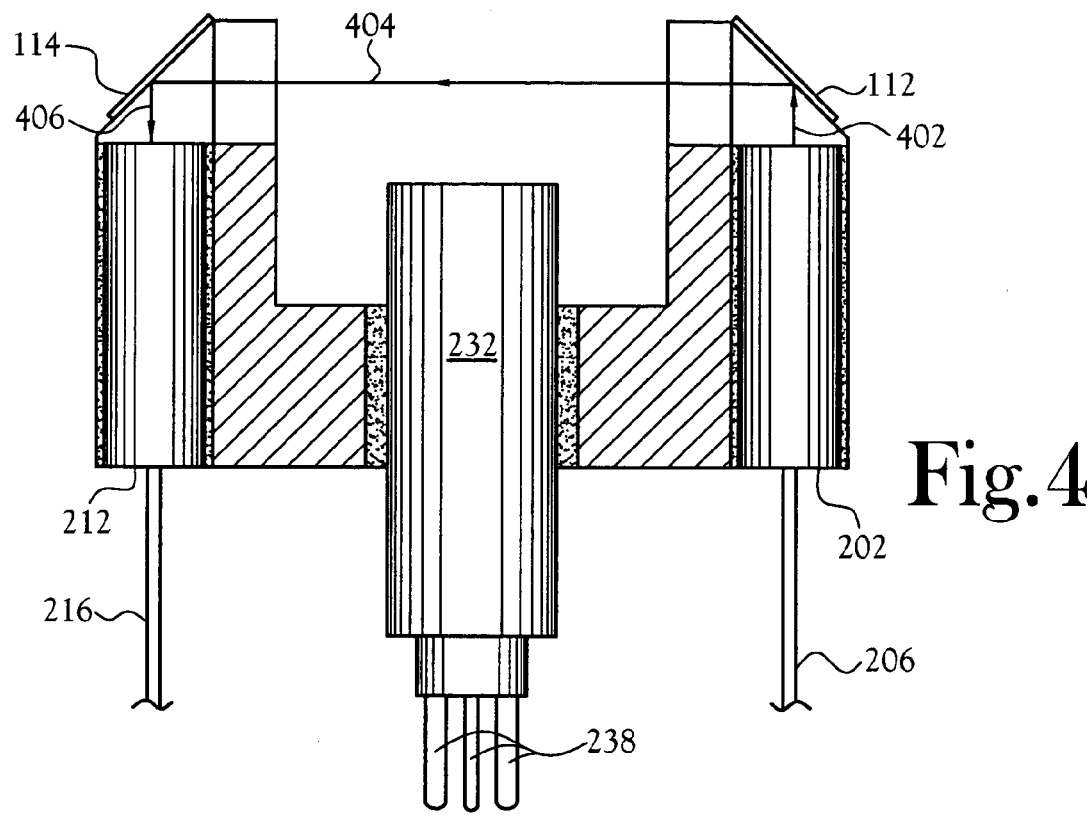
FIG. 4 is a cutaway view showing a normal optical path.

FIG. 4 illustrates the normal optical path 402, 404, 406 from the input collimator 202 and its associated fiber optic cable 206, reflected from the input mirror 112 downbeam to the output mirror 114 and into the output collimator 212 and its associated fiber optic cable 216. With this normal optical path 402, 404, 406, the actuator 232 has the shuttle 234 and mirror 236 retracted such that the optical path 404 is not interrupted.

Figure 5:
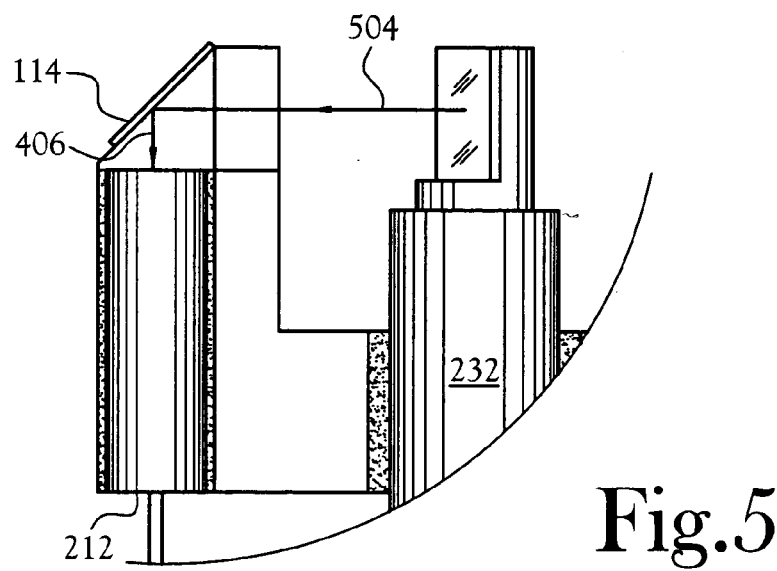
FIG. 5 is a partial cutaway view showing an optical path from the switch to an output collimator.

FIG. 5 illustrates a partial view of a switched optical path 504, 406 reflected by mirror 114, and into the output collimator 212 and its associated fiber optic cable 216. The actuator 232 has the shuttle 234 and mirror 236 extended such that the optical path 504 is reflected by mirror 236.

Figure 6:
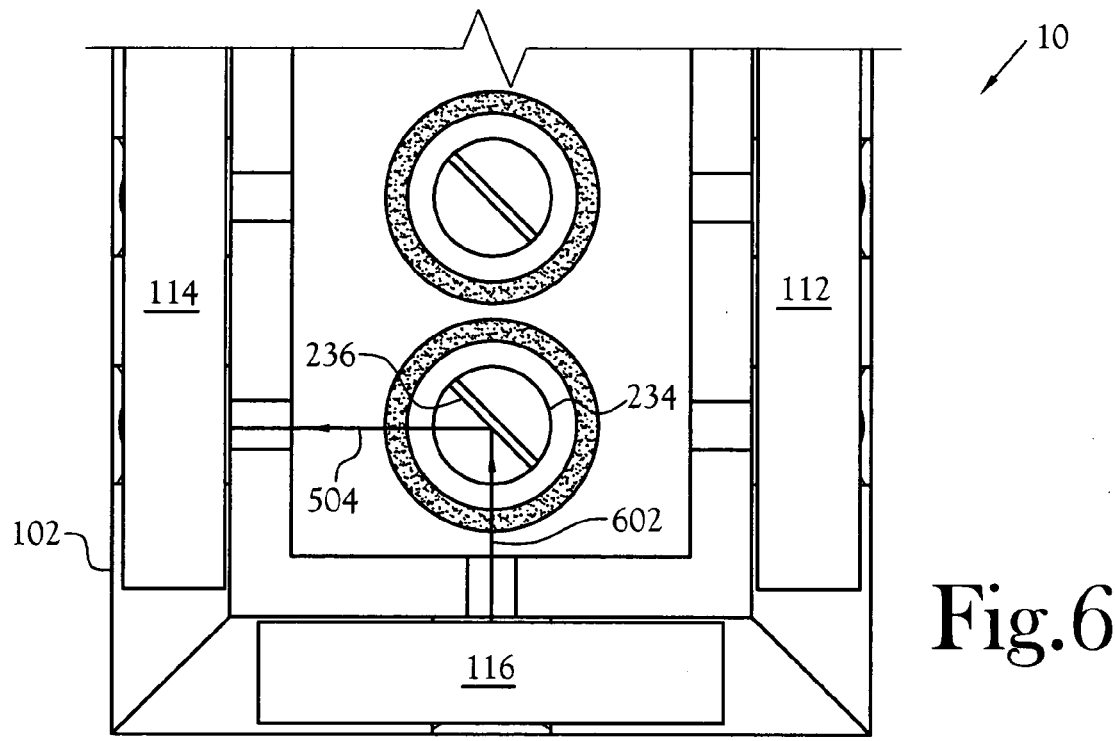
FIG. 6 is a top view showing an optical path from the tunable laser collimator to the output collimator.

FIG. 6 is a top view illustrating the switched optical path 602, 504 from the end collimator 312. In one embodiment, the end collimator 312 includes a fiber optic cable through which the optical path from a tunable laser originates. The optical path from the end collimator 312 follows a route similar to that from the input collimator 202 and is reflected from the mirror 116. The optical path 602 from the mirror 116 is reflected from the mirror 236 on actuator 232 to the output mirror 114 downbeam the actuator mirror 236. In another embodiment, the optical path 602, 504, 406 travels in a reverse direction such that the collimator 212 is an input collimator and the end collimator 312 is an output collimator. In this embodiment, any one of the input collimators 212 can be switched to the end, output collimator 312.

Figure 7:
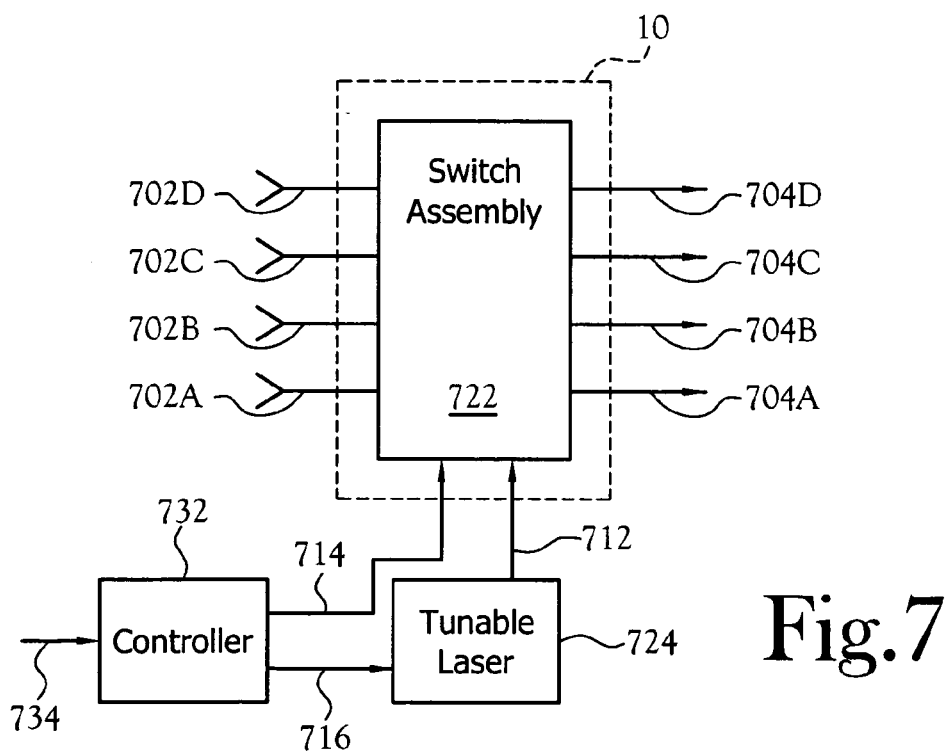
FIG. 7 is a block diagram of the switch assembly, tunable laser, and controller.

FIG. 7 illustrates a block diagram of a system including the switch assembly 10. A plurality of optical inputs 702A to 702D pass through the switch assembly, or array, 10 to a plurality of optical outputs 704A to 704D. Although a 4-by-5 switch assembly is illustrated, one skilled in the art will recognize that the number of inputs and outputs can vary without departing from the scope and spirit of the present invention. The illustrated embodiment shows a tunable laser 724 providing an optical input 712 to the end collimator. In another embodiment, the laser is a fixed-wavelength laser and is useful when all the switch assembly 10 inputs 702 operate at the same wavelength. The laser 724 can be either directly or externally modulated. In one embodiment, the tunable laser 724 is a hot spare that can be set to the desired color or wavelength of the input signal 702 to be replaced. A tunable laser 724 that can be tuned quickly, for example, in less than 20 nanoseconds, allows the laser 724 to spare the failed input 702 with minimal impact on the output signal 704. In one embodiment, the tunable laser has an output between 1200 and 1700 nanometers. In another embodiment, the laser 724 is tunable between 1529 to 1561 nanometers (the C-band). Those skilled in the art will recognize that the tunable spectrum of the laser 724 can vary to fit a particular application without departing from the scope and spirit of the present invention.

A controller 732 provides control signals 714, 716 to the switch assembly 10 and to the tunable laser 724. The control signals 714 to the switch assembly 10 cause the appropriate actuator 232 to operate and divert the optical signal 712 from the tunable laser 724 to the corresponding output 704A to 704D. In one embodiment, the controller input 734 is monitoring the switch assembly 10 inputs 702A to 702D, and when a failed input is sensed, the controller 732 causes the appropriate actuator 232 to divert the optical signal 712 from the tunable laser 724 to the appropriate output 704A to 704D. At the same time, the controller 732 modulates the tunable laser 724 with the appropriate signal for the failed 702A to 702D.

Figure 8:
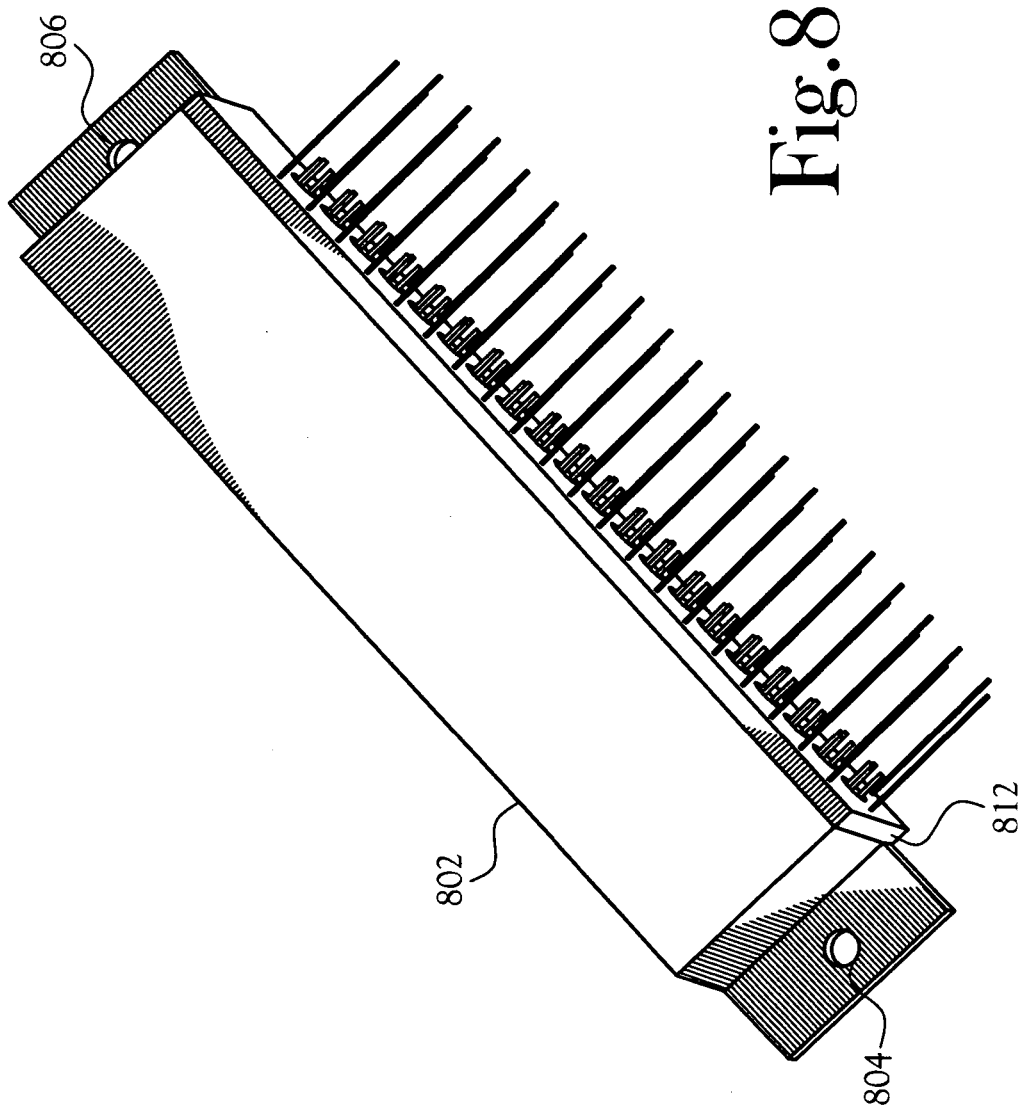
FIG. 8 is a perspective view of the switch assembly mounted inside a housing.

FIG. 8 illustrates an embodiment of the switch assembly 10 mounting in a housing 802 suitable for attaching to a printed circuit board. A base plate 812 supports the switch assembly 10 and has provisions for the fiber optic cables 206, 216 and electrical connections 238 to exit the base plate 812. The base plate 812 is attached to the housing 802, which has mounting holes 804, 806 for attaching the housing 802 to a printed circuit board.

In the illustrated embodiment, the electrical connections 238 for the actuators 232 protrude from the base plate 812 and the control wiring is soldered to the appropriate electrical connections 238. In another embodiment, a connector plugs into the protruding electrical connections 238. In still another embodiment, the electrical connections 238 are rigid wires formed such that the wires mate with through-openings in the printed circuit board, thereby facilitating electrical contact with the switch actuators 232.

Figure 9:
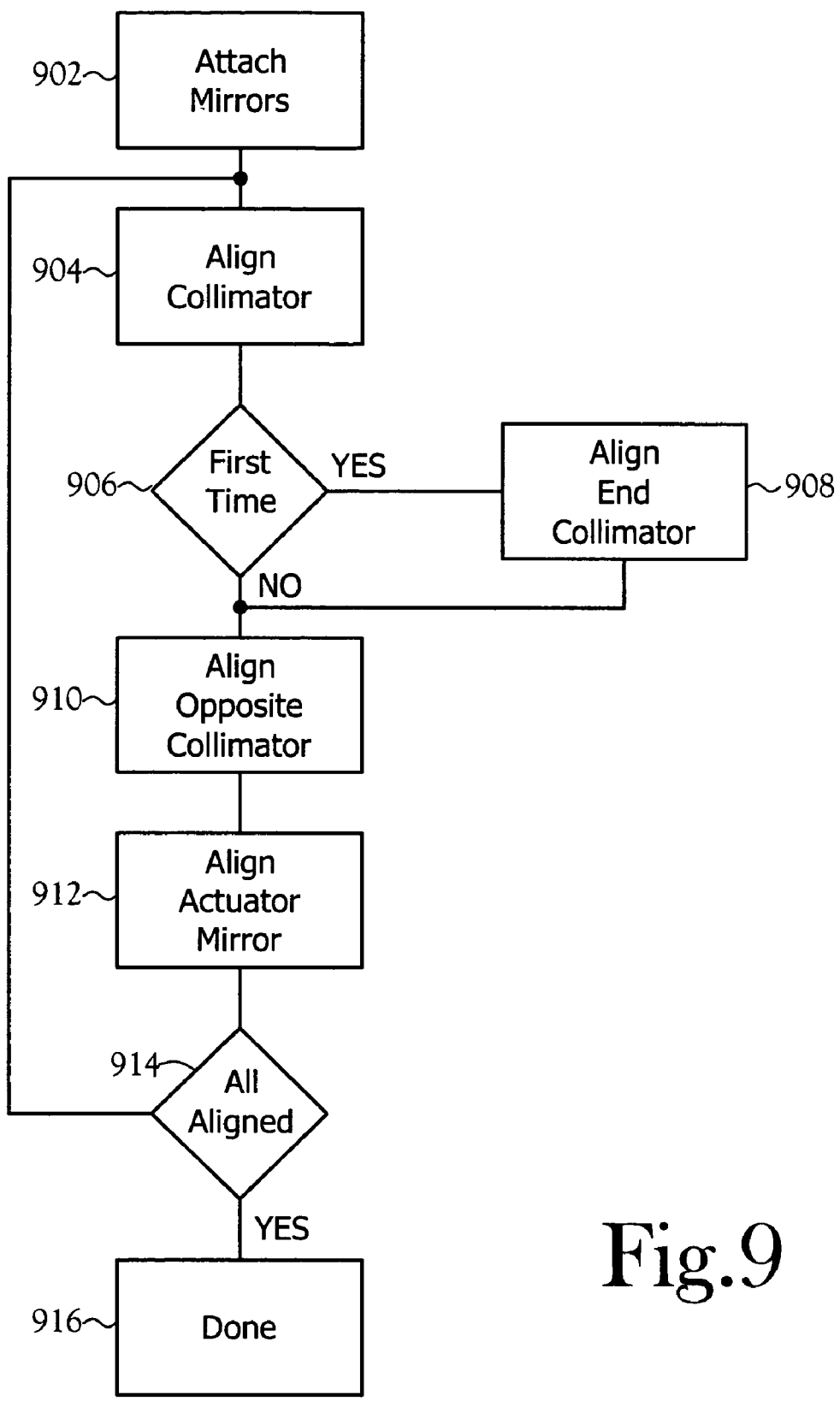
FIG. 9 is a flow chart of the steps for assembling an optical switch assembly.

FIG. 9 illustrates a flow chart detailing the major steps of assembling and active aligning the switch assembly 10. Before the first step in the figure can be performed, the optical bench 102 must be machined or fabricated. In one embodiment, the optical bench 102 has chamfers 242, 244, 342 precision cut at 45 degrees. Those skilled in the art will recognize that the angle of the chamfers can vary so long as the collimators 202, 212, 312 remain in alignment, that is, the input optical path is received by the output collimator. The bench 102 has slots machined on its sides for the collimators and has slots machined for the optical path to follow after being reflected from the mirrors 112, 114, 116.

The first step 902 after the optical bench 102 is machined is to attach the 45° mirrors 112, 114, 116 to the bench chamfers 242, 244, 342. The second step 904 is to align a first collimator, for example 202. This second step 904 includes temporarily positioning a 90° reflecting mirror in the bench 102 such that an optical signal passed through the collimator 202 is reflected back into the collimator 202 when it is aligned properly. The collimator 202 is positioned in a slot in the side of the bench 102, along with an amount of uncured adhesive 252 sufficient to secure the collimator 202 in position after curing. The collimator 202 is then positioned such that an optical signal fed into the collimator 202 is reflected off the 45° mirror attached in the first step 902 and reflected again by the temporary 90° mirror, which sends the optical signal back to the 45° mirror and into the collimator 202. In one embodiment, a high-precision robot actively aligns the collimator 202 by using the intensity of the reflected optical signal as feedback and moving the collimator 202 to maximize the signal. After the collimator 202 is positioned in alignment, the adhesive 252 is cured. In one embodiment, the adhesive 252 is cured with ultraviolet light. In another embodiment, the adhesive 252 has low shrinkage and its coefficient of thermal expansion is similar to that of the bench 102.

The next step 906 is a decision point. If the collimator 202 aligned in step 904 is the first collimator aligned, the end collimator 312 is next aligned 908. The step of aligning 908 the end collimator 312 involves similar sub-steps as for the step of aligning 904 the first collimator 202. A temporary mirror is installed at a 45° angle relative to the optical path from the first collimator 202. The end collimator 312, along with its adhesive, is actively aligned in its end slot by sending an optical signal from either the collimator 202 or the end collimator 312 and measuring the optical signal at the other collimator. The active alignment optical path is similar to that illustrated in FIGS. 5 and 6. In one embodiment, the first collimator 202 is installed at the end furthest from the end collimator 312, thereby ensuring that any errors in alignment of the end collimator will be reduced relative to all the other collimators. In another embodiment, the end collimator 312 is aligned 908 after the second collimator is aligned 910.

After the first collimator 202 is aligned 904, its opposite collimator 212 is aligned 910. This alignment 910 includes actively aligning the opposite collimator 212 after the collimator 212 and its uncured adhesive 252 are positioned in the optical bench 102. An optical signal is fed into either of the two collimators 202 or 212 and the signal is measured at the other collimator 202 or 212 after being reflected from the two mirrors 112, 114. After the proper alignment is located, the adhesive 252 is cured.

The next step 912 is to align the actuator 232 and its mirror 236. The actuator 232 and its adhesive 254 is inserted into an opening 332 in the optical bench 102. The actuator 232 is actuated such that its mirror 236 is extended into the optical path between the collimators 202, 212. The actuator 232 is actively aligned by sending an optical signal from either the first collimator 202 or the end collimator 312, and measuring the optical signal at the other collimator 202 or 312. After alignment of the actuator mirror 236 is achieved, the adhesive 254 is cured.

The previous steps of aligning the first collimator 904, the opposite collimator 910, and the actuator mirror 912 are repeated 914 for the remaining pairs of collimators. After all the collimators and actuators are aligned, the active alignment is finished, or done 916.

Figure 10:
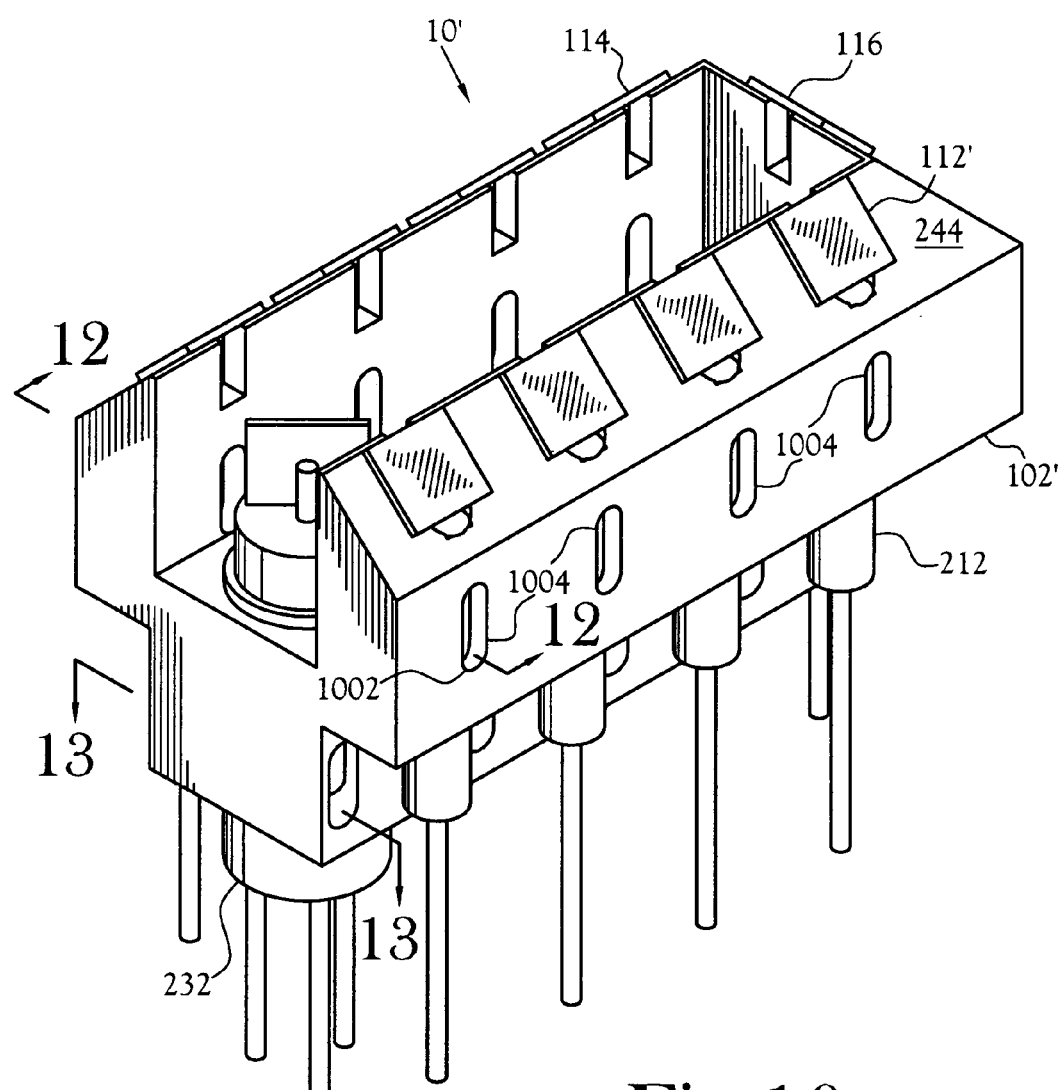
FIG. 10 is a perspective view of another embodiment of an optical bench showing the optical collimators and switches.

FIG. 10 is a perspective view of another embodiment of a switch assembly 10'. In the illustrated embodiment, the actuators 232 and the collimators 212 are secured to the optical bench 102' by an adhesive system in which adhesive is applied in slots 1002, 1004 in the optical bench 102'. The adhesive system is described in U.S. application Ser. No. 10/672,595, filed Sep. 26, 2003, titled "Adhesive System for Optic Devices," which is incorporated herein by reference. With optical devices, the precision with which the optical path is directed affects the performance of the device. It is desirable to minimize any displacement of any of the optical elements relative to other elements. Further, it is desirable that the alignment of the optical elements remain stable over widely varying environmental conditions, including temperature and humidity. In prior art devices, displacement occurs when the environmental conditions, including ambient temperature, varies over a relatively small range.

In the illustrated embodiment, the actuator 232 has an actuator mirror 236 that moves between two positions. In one position, the actuator mirror 236 optically connects one corresponding collimator 212 to the collimator at the end of the optical bench 102'. In the other position, the actuator mirror 236 is not in the optical path and the one corresponding collimator 212 is optically connected to the other corresponding collimator 212.

Those skilled in the art will recognize that the collimators 212 and the actuators 232 are considered optical elements 212, 232. For illustration purposes, with respect to the adhesive system the terms are used interchangeably when referring to an element being adhered to a optical bench 102'. Further, in describing the adhesive system, the optical elements 212, 232 and optical bench 102' may be variously described as members. In other words, in one the optical bench 102' is a first member and the optical element 212, 232 is a second member. In this embodiment the first member includes an opening for receiving the second member, and the first member has slots 1002, 1004 into which adhesive is introduced.

In the illustrated embodiment, the slots 1002, 1004 are longitudinal slots, that is, the slots 1002, 1004, relative to the longitudinal axis of the optical element 212, 232, are longer than they are wide. The illustrated slots 1002,04, as seen in a plan view, are two semicircles that are joined by straight lines. The longitudinal slots 1002, 1004 have a longitudinal axis which passes through the centers of the semicircles. The slots 1002, 1004 have another axis which passes between the centers of the semicircles and is aligned with the passage through the optical bench 102'. This axis is a through-axis and follows the passage from the surface of the optical bench 102' to the inside surface of the openings 1102, 1004 and to the opposite surface of the optical bench 102'.

FIG. 10 also illustrates another embodiment of the mirrors 112', 114'. The mirrors 112', 114' illustrated in FIG. 10 include a plurality of mirrors 112', 114', one for each collimator 212 along the two long sides of the optical bench 102'. The plurality of mirrors 112', 114' is to be contrasted to the extended mirrors 112, 114 illustrated in FIG. 1. In both illustrated embodiments, the mirrors 112', 114', 112, 114 reflect the optical signal from their respective collimator 212.

Figure 11:
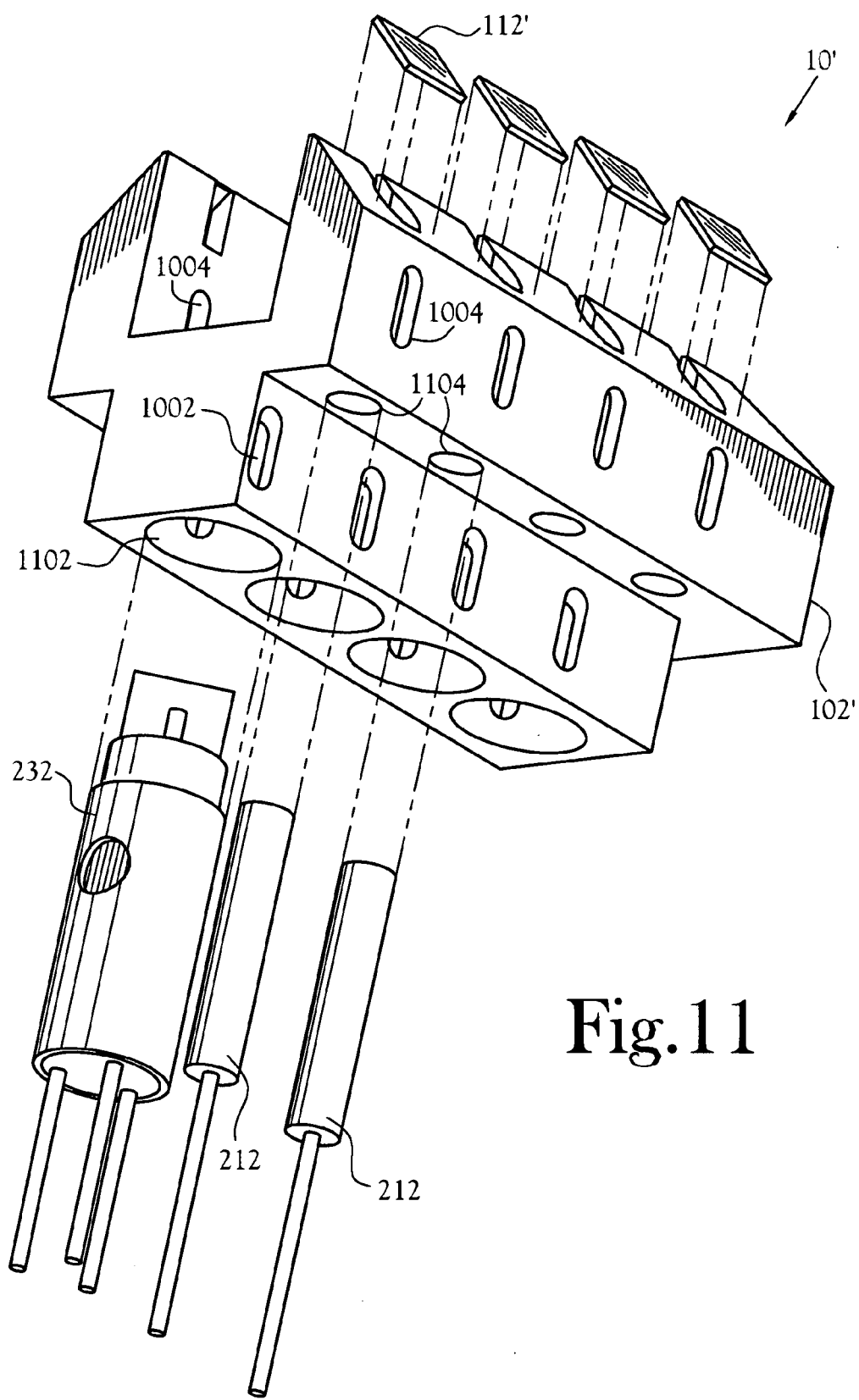
FIG. 11 is an exploded view of the embodiment illustrated in FIG. 10.

FIG. 11 is an exploded view of the embodiment illustrated in FIG. 10. For illustration purposes, only a few of the optical elements 232, 212 an mirrors 112' are illustrated separate from the optical bench 102'. The actuator 232 loosely fits into the cylindrical hole 1102. The slots 1002 penetrate the optical bench 102', opening a passage between the holes 1102 and the outside surface of the optical bench 102'. The collimators 212 loosely fit into the cylindrical holes 1104. The slots 1004 penetrate the optical bench 102', opening a passage between the holes 1104 and the outside surface of the optical bench 102'.

Figure 12:
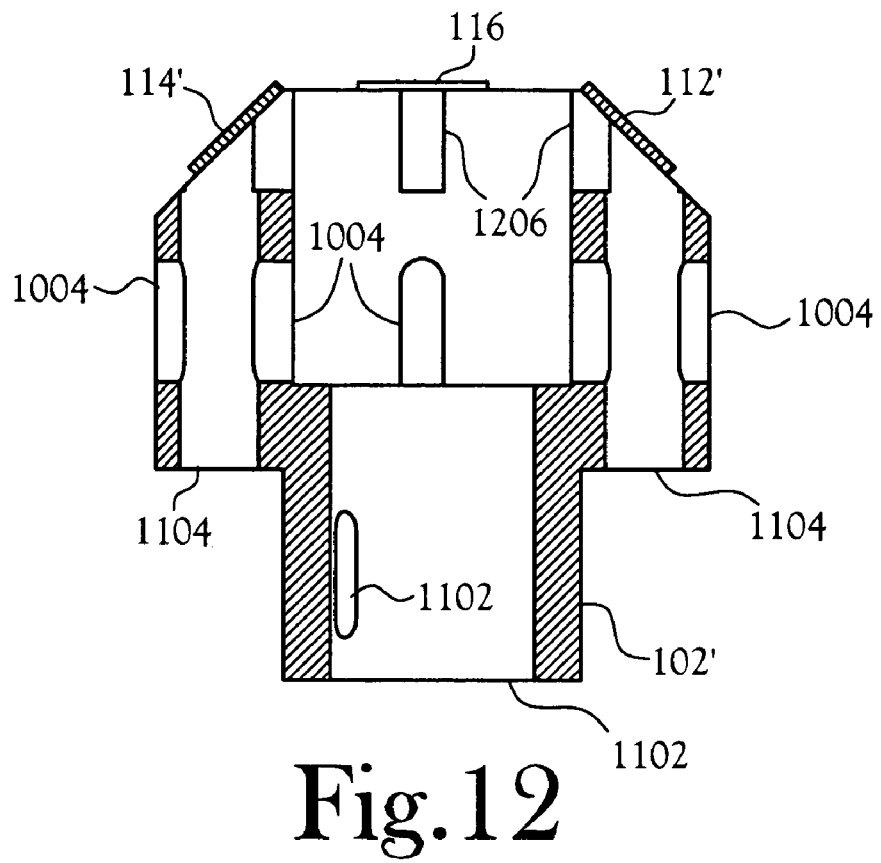
FIG. 12 is a cross-sectional view of the optical bench illustrated in FIG. 10.

FIG. 12 is a cross-sectional view of the embodiment of the optical bench 102' illustrated in FIG. 10. In the illustrated embodiment, the slots 1004 for the collimators 212 are oriented normal to the surface of the optical bench 102' and the longitudinal axis of the cylindrical holes 1104. The slots 1102 for the actuators 232 are oriented obliquely to the surface of the optical bench 102', but the through-axis of the slots are substantially perpendicular to the longitudinal axis of the cylindrical holes 1102. The orientation of the slots 1102 is better illustrated in FIG. 13. Also visible in FIG. 12 are the openings 1206, which allow the optical signal 402, 406 to travel to and from the collimators 212 and be reflected from the mirrors 112', 114', 116.

Figure 13:
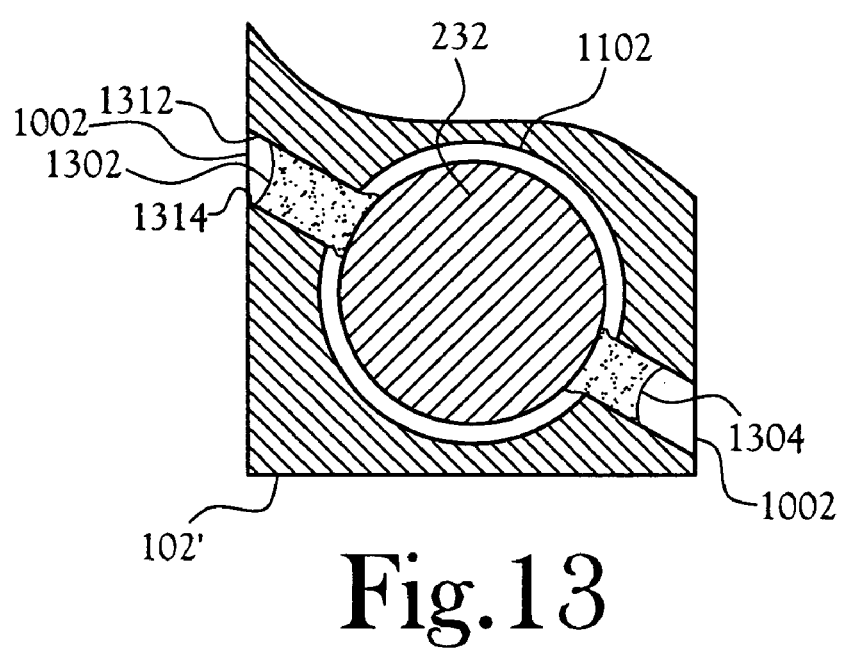
FIG. 13 is a partial cross-sectional view of the lower portion of the optical bench illustrated in FIG. 10.

FIG. 13 is a partial cross-sectional view of the lower portion of the embodiment of the optical bench 102' illustrated in FIG. 10. The opening 1102 is centered in the bottom portion of the optical bench 102'. The slots 1002 are oblique to the surface of the optical bench 102' and are located on diametrically opposed sides of the optical element 232. The optical element 232 fits loosely into the opening 1002, as shown by the gap between the optical element 232 and the opening 1102. The actual location of the optical element 232 in the opening is dependant upon its proper alignment, which is discussed relative to FIG. 9. An adhesive 1302, 1304 connects the optical bench 102' to the optical element 232 by bridging the distance between two walls 1312, 1314 of the slots 1002 and attaching to the optical element 232.

The adhesive 1302, 1304 has a high viscosity, which prevents the adhesive from flowing into the gap between the optical bench 102' and the optical element 232. A viscosity equal to or greater than 5000 centipoise, when used with the gaps typically found in optical elements 232, is sufficient to prevent the adhesive flowing, or wicking, into the gap. In one embodiment, the adhesive has a viscosity of 12,000 to 15,000 centipoise. The gap is sized to allow the optical element, which in the illustrated embodiment is an actuator 232, to be moved within the optical bench 102' to align the optical element 232 to minimize insertion loss. Once the optical element 232 is aligned, the adhesive 1302, 1304 is applied and cured. In another embodiment, the adhesive 1302, 1304 is applied, the optical element 232 is aligned, and the adhesive 1302, 1304 is cured. Because of the low shrinkage and thermal stability of the adhesive 1302, 1304, in combination with the arrangement of the slots 100 with respect to the optical element 232, the element's 232 alignment is maintained after curing and during operation.

In one embodiment, a UV curable adhesive is selected. In another embodiment, the transition point of the adhesive 1302, 1304 is outside the operating temperature range, which enhances the dimensional stability of the optical device 10. In still another embodiment, keeping the transition point outside the operating range is accomplished by using fillers. In an embodiment of the adhesive with a filler, when the epoxy is cured, the filler is placed in compression. The filler, in one embodiment is amorphous silica, which can be spherical or angular or a combination of the two. The filler is blended with the adhesive to form an admixture having a concentration of between 60 to 84% filler, with concentrations between 68 and 80% filler showing very good results. Epoxy normally experiences approximately 20% shrinkage when cured. When the epoxy with filler is cured, the filler granules come into direct contact with each other, resulting in compressive forces being applied to the filler as the epoxy shrinks. The amorphous silica experiences very little shrinkage or expansion under ambient temperature ranges and is a window to ultraviolet light, so that it does not interfere with the curing process for the adhesive. Amorphous silica is also relatively inert chemically and thermally, and it can withstand significant compression stress and is available at reasonable cost. Those skilled in the art will recognize that other materials with properties similar to amorphous silica can be used without departing from the spirit and scope of the present invention.

In one embodiment, the amorphous silica has a crystalline content of less than 0.5%. At 99.5% purity of amorphous silica the morphology is stable. As impurities increase in the amorphous silica, the temperature related properties suffer because of the manufacturing techniques that result in increased crystalline content with increased impurities. A typical lower limit of purity would be approximately 98%; however, purity of approximately 96% may be acceptable based on the chemical content of the impurities.

In another embodiment, the amorphous silica has an average particle size less than 10 micrometers. Epoxy with amorphous silica filler of at least 68% concentration of filler experiences less than 0.1%, oftentimes between 0.04 to 0.05% during testing, linear shrinkage during curing. Further, thermal expansion/contraction is limited to less than 100 ppm per degree Celsius, typically 6 to 60 ppm, over a temperature range of −40 to +85 degrees Centigrade.

The illustrated configuration has certain features that result in a stable configuration. In particular, after the optical element 232 is positioned and aligned, the adhesive 1302, 1304 is applied and cured with very little shifting of the optical element 232 relative to the optical bench 102' occurring as a result of the curing. The adhesive 1302, 1304 adheres to the sidewalls 1312, 1314 of the longitudinal slot 1002 and to the optical element 232. The surface of the adhesive 1302, 1304 opposite the optical element 232 is exposed to the environment and is free to contract and expand.

The adhesive 1302, 1304, as it cures, shrinks to some degree, which causes tension forces to be applied to the slot 1002 side walls 1312, 1314. Further, because of the opposing slots 1002, as the adhesive shrinks during curing, the optical element experiences tension between the two applications of adhesive 1302, 1304. These tension forces are small because, during curing, the adhesive 1302, 1304 shrinks only a small amount. In testing, good performance of the adhesive connection was found when the slot 1002 had a longitudinal axis aligned with the longitudinal axis of the optical element 232, and the slot's longitudinal axis was substantially longer than the width of the slot 1002. The joint, or seam, formed by the adhesive 1302, 1304 bridging the gap adjacent the slot side walls 1312, 1314 and the surface of the optical element 232 is longer when the slot 112 has a long longitudinal axis. The joint extending along the longitudinal axis of the optical element 232 aids in maintaining the alignment of the optical element 108 relative to the optical bench 102'.

Figure 14:
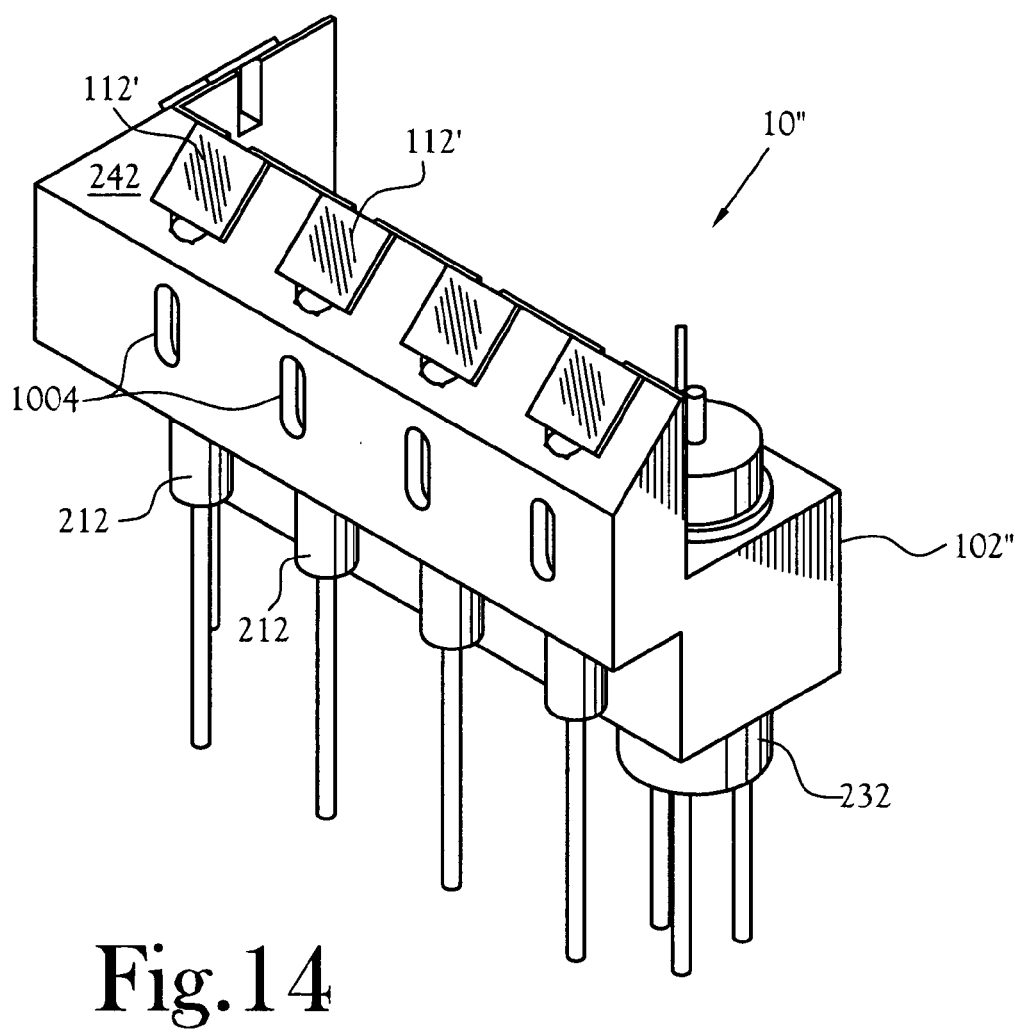
FIG. 14 is a perspective view of still another embodiment of an optical bench showing the optical collimators and switches.
Figure 15:
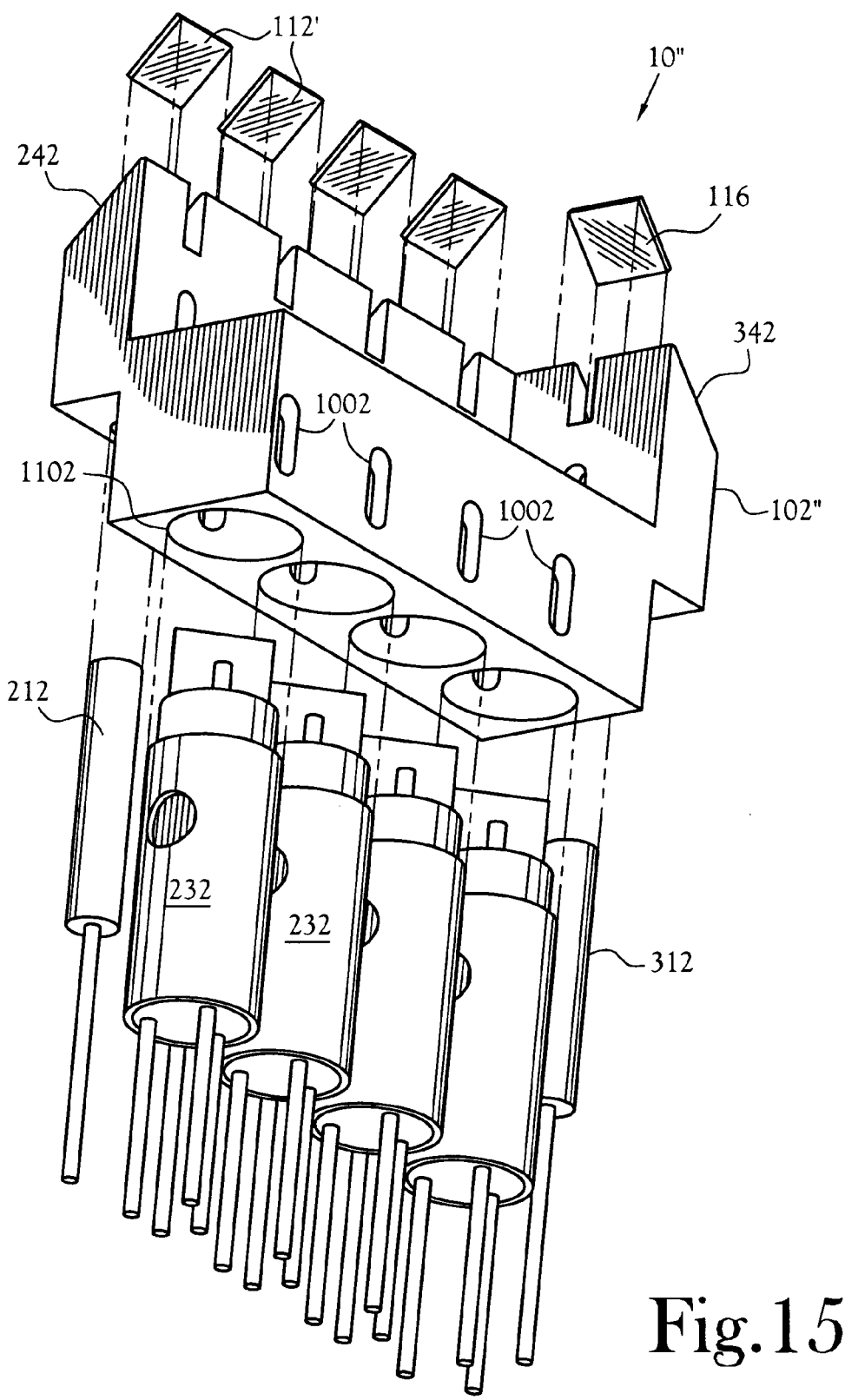
FIG. 15 is an exploded view of the embodiment illustrated in FIG. 14.

FIG. 14 is a perspective view of still another embodiment of an optical switch 10" showing the optical collimators 212 and actuators 232, 312 installed in an optical bench 102". FIG. 15 is an exploded view of the embodiment illustrated in FIG. 14. The optical bench 102" has only two chamfers 242, 342 between its side walls and top surfaces, contrasted to the three chamfers 242, 244, 342 of the embodiments illustrated in FIGS. 1 through 13.

The embodiment illustrated in FIGS. 14 and 15 shows an optical bench 102" and optical elements 212, 312, 232 configured as a 1×4 or 4×1 switch, depending upon whether an optical signal at the collimator 312 at the short end is an input or output optical signal, respectively. For example, with a 1×4 switch, an optical signal is input to collimator 312, reflected by mirror 116, and reflected by a mirror 236 on one of the four actuators 232 to its corresponding mirror 112' and into its corresponding collimator 212. By selecting one of the four actuators 232, the input optical signal is switched to the corresponding one of the four output collimators 212.

In the illustrated embodiment, the actuator 232 has an actuator mirror 236 that moves between two positions. In one position, the actuator mirror 236 optically connects one corresponding collimator 212 to the collimator 312 at the end of the optical bench 102". In the other position, the actuator mirror 236 is not in the optical path and the corresponding collimator 212 is not optically connected to the end collimator 312.

FIG. 9 illustrates a flow chart detailing the major steps of assembling and active aligning the embodiments of the switch assembly 10', 10" illustrated in FIGS. 10 to 15. Before the first step is performed, the optical bench 102', 102" must be machined or fabricated. In one embodiment, the optical bench 102', 102" has chamfers 242, 244, 342 precision cut at 45 degrees. Those skilled in the art will recognize that the angle of the chamfers can vary so long as the collimators 212, 312 remain in alignment, that is, the input optical path is received by the output collimator. The bench 102', 102" has openings 1102, 1104 formed in it and has slots machined for the optical path to follow after being reflected from the mirrors 112', 114', 116.

The first step 902 after the optical bench 102 is machined is to attach the 45° mirrors 112', 114', 116 to the bench chamfers 242, 244, 342. The second step 904 is to align a first collimator, for example 212. This second step 904 includes temporarily positioning a 90° reflecting mirror in the bench 102', 102" such that an optical signal passed through the collimator 212 is reflected back into the collimator 212 when it is aligned properly. The collimator 212 is positioned in an opening 1004 in the bench 102', 102". The collimator 212 is then positioned such that an optical signal fed into the collimator 212 is reflected off the 45° mirror attached in the first step 902 and reflected again by the temporary 90° mirror, which sends the optical signal back to the 45° mirror and into the collimator 212. In one embodiment, a high-precision robot actively aligns the collimator 212 by using the intensity of the reflected optical signal as feedback and moving the collimator 212 to maximize the signal. After the collimator 212 is positioned in alignment, an amount of uncured adhesive 1302, 1304 sufficient to secure the collimator 212 in position after curing is put in the slots 1104 and the adhesive 1302, 1304 is cured. In one embodiment, the adhesive 1302, 1304 is cured with ultraviolet light. In another embodiment, the adhesive 1302, 1304 has low shrinkage and its coefficient of thermal expansion is similar to that of the bench 102', 102". In another embodiment, the adhesive 1302, 1304 is applied before the collimator 212 is aligned and cured after aligning.

The next step 906 is a decision point. If collimator 212 aligned in step 904 is the first collimator aligned, the end collimator 312 is aligned 908 next. The step of aligning 908 the end collimator 312 involves similar sub-steps as for the step of aligning 904 the first collimator 212. A temporary mirror is installed at a 45° angle relative to the optical path from the first collimator 212. The end collimator 312 is actively aligned in an end opening 1004 by sending an optical signal from either the collimator 212 or the end collimator 312 and measuring the optical signal at the other collimator. In one embodiment, the active alignment optical path is similar to that illustrated in FIGS. 5 and 6. In one embodiment, the first collimator 212 is installed at the end furthest from the end collimator 312, thereby ensuring that any errors in alignment of the end collimator will be reduced relative to all the other collimators. In another embodiment, the end collimator 312 is aligned 908 after the second collimator is aligned 910.

For the embodiment illustrated in FIGS. 10 and 11, which has opposing collimators 212, after the first collimator 212 is aligned 904, its opposite collimator 212 is aligned 910. This alignment 910 includes actively aligning the opposite collimator 212 after the collimator 212 and its uncured adhesive 1302, 1304 are positioned in the optical bench 102', 102". An optical signal is fed into either of the two collimators 212 and the signal is measured at the other collimator 212 after being reflected from the two mirrors 112', 114'. After the proper alignment is located, the adhesive 1302, 1304 is cured.

The next step 912 is to align each actuator 232 and its mirror 236. The actuator 232 is inserted into an opening 332 in the optical bench 102', 102". The actuator 232 is actuated such that its mirror 236 is extended into the optical path between the collimators 212. The actuator 232 is actively aligned by sending an optical signal from either the first collimator 212 or the end collimator 312, and measuring the optical signal at the other collimator 212 or 312. After alignment of the actuator mirror 236 is achieved, the adhesive 1302, 1304 is placed in the slots 1102 and the adhesive 1302, 1304 is cured. In another embodiment, the adhesive 1302, 1304 is applied before the actuator 232 is aligned and cured after aligning.

The previous steps of aligning the first collimator 904, the opposite collimator 910, and the actuator mirror 912 are repeated 914 for the remaining collimators. After all the collimators and actuators are aligned, the active alignment is done 916.

The optical switch assembly 10, 10', 10" includes various functions. The function of accepting at least one optical input is implemented, in various embodiments, by the collimators 212, 312. In the embodiment in which the optical switch assembly 10" is a 1×N switch, the function of accepting at least one optical input is implemented by the end collimator 312. the embodiment in which the optical switch assembly 10" is an N×1 switch, the function of accepting at least one optical input is implemented by the bank of collimators 212, with the number of collimators 212 equal to the number N.

The function of outputting at least one optical output is implemented, in various embodiments, by the collimators 212, 312. In the embodiment in which the optical switch assembly 10" is an N×1 switch, the function of outputting at least one optical output is implemented by the end collimator 312. the embodiment in which the optical switch assembly 10" is a 1×N switch, the function of outputting at least one optical output is implemented by the bank of collimators 212, with the number of collimators 212 equal to the number N.

The function of directing one of said at least one optical input to one of said at least one optical output is implemented, in one embodiment, by the mirrors 112', 114', 116 and the actuators 232. A selected actuator mirror 236 is moved into a first position in which an input collimator 212, 312 is optically connected with an output collimator 212, 312, via the mirrors 112', 114', 116.

The function of securing a plurality of optical elements is implemented, in one embodiment, by the adhesive system illustrated in FIGS. 10–13, which includes a through-opening 1102, 1104 that receives the optical element 232, 212, 312 and a pair of slots 1002, 1004 associated with the through-opening 1102, 1104 with an adhesive 1302, 1304 securing the optical element 232, 212, 312. In another embodiment, the function of securing a plurality of optical elements is implemented by an adhesive 254 disposed between an optical element 232, 202, 212, 312 and the optical bench 102.

The function of accepting a plurality of optical inputs is implemented, for one embodiment, by the collimators 202, 212. The function of outputting a plurality of optical outputs is implemented, for one embodiment, by the collimators 202, 212, which are arranged opposite the plurality of optical inputs.

The function of redirecting an optical signal to a selected one of said plurality of optical outputs is implemented, for one embodiment, by the collimator 312 receiving an optical input signal, reflecting that signal from the end mirror 116, reflecting the signal from a selected one of an actuator mirror 236 into a corresponding mirror 114, 112', 114' and output collimator 212.

From the foregoing description, it will be recognized by those skilled in the art that an optical switch assembly has been provided. The switch assembly, in one embodiment, can switch a spare input to any one output, and in another embodiment, can switch any input to a separate output. Additionally, a method of actively aligning such an assembly has been described. Also, one embodiment secures the optical elements to the optical bench via an adhesive system involving slots containing adhesive. Another embodiment is a 1×N or an N×1 switch in which one collimator from a bank of collimators is selected for connection with an end collimator.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for switching at least one optical signal, said apparatus comprising:
    an optical bench;
    a plurality of optical elements, each one of said plurality of optical elements selected from a group consisting of a plurality of first collimators, an end collimator, and a plurality of actuators, each one of said plurality of actuators having an actuator mirror selectively movable between a first position and a second position, said actuator mirror in said first position optically connecting a corresponding one of said plurality of first collimators and said end collimator, said actuator mirror in said second position not optically connecting a corresponding one of said a plurality of first collimators and said end collimator;
    at least one first mirror in a first optical path between a corresponding one of said plurality of first collimators and a corresponding one of said actuator mirror in said first position, said at least one mirror fixed to said optical bench;
    an end mirror in a first optical path between said end collimator and one of said actuator mirrors in said first position, said end mirror fixed to said optical bench;
    a plurality of through-openings in said optical bench, each one of said plurality of through-openings adapted to receive one of said plurality of optical elements;
    a plurality of pairs of adhesive through-openings in said optical bench, each one of said first pair of adhesive through-openings having a through-axis substantially perpendicular to a longitudinal axis of a corresponding one of said plurality of through-openings, each one of said first pair of adhesive through openings being diametrically opposed to said corresponding one of said plurality of through-openings; and
    an adhesive disposed within each one of said plurality of pairs of adhesive through-openings, said adhesive adapted to prevent wicking between said optical bench and said corresponding one of said plurality of optical elements.

2. The apparatus of claim 1 wherein each of said plurality of pairs of adhesive through-openings has a longitudinal axis parallel to a longitudinal axis of a corresponding one of said plurality of optical elements.

3. The apparatus of claim 1 wherein said plurality of first collimators and said end collimator are substantially parallel.

4. The apparatus of claim 1 wherein said plurality of first collimators and said end collimator each have an optical fiber connection that protrudes in a common direction from said optical bench.

5. The apparatus of claim 1 wherein said at least one first mirror and said end mirror are fixed to said optical bench with a mirror adhesive.

6. The apparatus of claim 5 wherein said mirror adhesive has a coefficient of thermal expansion similar to that of said optical bench such that said at least one first mirror and said end mirror remain in alignment within an operating temperature range of said apparatus.

7. The apparatus of claim 5 wherein said mirror adhesive is a quick curing adhesive blended with a plurality of amorphous silica spheres of at least one selected diameter.

8. The apparatus of claim 1 wherein said optical bench, said plurality of optical elements, said at least one first mirror, and said end mirror have a substantially common coefficient of thermal expansion.

9. The apparatus of claim 1 wherein said plurality of optical elements, said at least one first mirror, and said end mirror maintain an alignment relative to each other such that an optical signal passing between one of said plurality of first collimators and said end collimator remains at a full strength over a preselected operating temperature range.

10. The apparatus of claim 9 wherein said preselected operating temperature range of said apparatus has a lower limit of −40 degrees Centigrade.

11. The apparatus of claim 9 wherein said preselected operating temperature range of said apparatus has an upper limit of +85 degrees Centigrade.

12. The apparatus of claim 1 wherein said adhesive is a quick curing adhesive blended with a plurality of amorphous silica spheres of at least one selected diameter.

13. The apparatus of claim 1 wherein said adhesive is an epoxy with a filler having a concentration of at least 68%, said filler being amorphous silica.

14. The apparatus of claim 1 wherein said adhesive includes a filler of amorphous silica having an average particle size less than or equal to 10 micrometers.

15. The apparatus of claim 1 wherein said adhesive has no more than 0.1% shrinkage during curing.

16. The apparatus of claim 1 wherein said adhesive has no more than 100 ppm per degree Celsius of thermal expansion over a temperature range from −40 degrees Celsius to +85 degrees Celsius.

17. The apparatus of claim 1 wherein said adhesive has a transition point outside a preselected operating temperature range of said apparatus.

18. The apparatus of claim 17 wherein said preselected operating temperature range of said apparatus has a lower limit of −40 degrees Centigrade.

19. The apparatus of claim 17 wherein said preselected operating temperature range of said apparatus has an upper limit of +85 degrees Centigrade.

20. The apparatus of claim 1 wherein said optical bench is mounted inside a housing, and said housing is adapted for printed circuit board mounting.

21. An apparatus for switching at least one optical signal, said apparatus comprising:
    a plurality of first collimators;
    at least one first reflector held in spatial relationship with said plurality of first collimators, each said at least one reflector in an optical path of a corresponding one of said plurality of first collimators;
    an end collimator held in spatial relationship with said plurality of first collimators;

an end reflector held in spatial relationship with said end collimator, said end reflector in an optical path of said end collimator; and a plurality of actuators held in spatial relationship with a corresponding one of said plurality of first collimators, each one of said plurality of actuators having an actuator reflector selectively movable between a first position and a second position, said actuator reflector in said first position optically connecting a corresponding one of said plurality of first collimators to said end collimator, said actuator reflector in said second position not optically connecting a corresponding one of said plurality of first collimators to said end collimator.

22. The apparatus of claim 21 wherein said plurality of first collimators, said at least one first reflector, said end collimator, said end reflector, and said plurality of actuators maintain an alignment relative to each other such that an optical signal passing from said plurality of first collimators to said end collimator remains substantially undiminished over a preselected operating temperature range.

23. The apparatus of claim 21 wherein said plurality of first collimators, said at least one first reflector, said end collimator, said end reflector, and said plurality of actuators are secured with an adhesive.

24. The apparatus of claim 21 wherein each one of said plurality of first collimators is received by a collimator through-opening and secured by an adhesive disposed in a pair of adhesive through-openings, said pair of adhesive through openings having a through-axis substantially perpendicular to a longitudinal axis of said collimator through-opening, said pair of adhesive through-openings being diametrically opposed to said collimator through-opening.

25. The apparatus of claim 21 wherein said end collimator is received by a collimator through-opening and secured by an adhesive disposed in a pair of adhesive through-openings, said pair of adhesive through-openings having a through-axis substantially perpendicular to a longitudinal axis of said collimator through-opening, said pair of adhesive through-openings being diametrically opposed to said collimator through-opening.

26. The apparatus of claim 21 wherein each one of said plurality of actuators is received by an actuator through-opening and secured by an adhesive disposed in a pair of adhesive through-openings, said pair of adhesive through-openings having a through-axis substantially perpendicular to a longitudinal axis of said actuator through-opening, said pair of adhesive through-openings being diametrically opposed to said actuator through-opening.

27. A method for actively aligning an optical switch assembly, said method comprising the steps of:

a) attaching a plurality of mirrors to an optical bench having a plurality of substantially parallel through-openings and a plurality of surfaces at approximately 45 degrees relative to each one of said plurality of substantially parallel through-openings, each one of said plurality of mirrors attached to a corresponding one of said plurality of surfaces;

b) inserting an optical element into one of said substantially parallel through-openings;

c) aligning said optical element; and d) curing an adhesive in a corresponding pair of adhesive through-openings in said optical bench.

28. The method of claim 27 wherein said step c) aligning said optical element includes, where said optical element is a first collimator and said optical element being a first element inserted:

c1) placing a temporary 90 degree mirror in said optical bench;

c2) passing an optical signal through said first collimator such that said optical signal reflects first off a corresponding one of said plurality of mirrors, second off said temporary mirror, and then off said corresponding one of said plurality of mirrors;

c3) monitoring said optical signal reflected into said first collimator;

c4) positioning said first collimator to maximize said reflected optical signal; 20 c5) curing an adhesive in a corresponding pair of adhesive through-openings in said optical bench; and c6) removing said temporary mirror.

29. The method of claim 27 wherein said step c) aligning said optical element includes, where said optical element is an actuator having an actuator mirror.

f1) passing an optical signal through a first collimator such that said optical signal reflects first off a corresponding one of said plurality of mirrors, second off said actuator mirror, and then off a corresponding one of said plurality of mirrors into an end collimator;

f2) monitoring said optical signal reflected into said end collimator;

f3) positioning said actuator to maximize said reflected optical signal; and f4) curing an adhesive in a corresponding pair of adhesive through-openings in said optical bench.

30. An optical device for switching at least one optical signal, said optical device comprising:

a first collimator;

a second collimator;

an end collimator;

a pair of actuators each having an actuator mirror, said actuator mirror movable between a first and second position;

a plurality of mirrors; and an optical bench defining five optical element through-openings for receiving a corresponding one of said first, second, and end collimators and said pair of actuators, each of said five optical element through-openings having a corresponding one of five pair of adhesive through-openings defined in said optical bench, said first, second, and end collimators and said pair of actuators secured in said corresponding five optical element through-openings by an adhesive disposed in said five pair of adhesive through-openings, said plurality of mirrors secured to said optical bench with said adhesive, said first collimator, a corresponding one of said pair of actuators and said actuator mirror in said first position, said end collimator, and a corresponding two of said plurality of mirrors positioned such that there is a first optical path between said first collimator and said end collimator, said second collimator, a corresponding one of said pair of actuators and said actuator mirror in said first position, said end collimator, and a corresponding two of said plurality of mirrors positioned such that there is a second optical path between said second collimator and said end collimator.

31. The optical device of claim 30 wherein said adhesive is adapted to prevent wicking between said optical bench and said first, second, and end collimators and said pair of actuators.

32. The optical device of claim 30 wherein each of said plurality of pairs of adhesive through-openings has a longitudinal axis parallel to a longitudinal axis of a corresponding one of said plurality of optical elements.

33. The optical device of claim 30 wherein said adhesive is an epoxy with a filler, said filler being amorphous silica.

34. The optical device of claim 30 wherein said adhesive includes a filler of amorphous silica having an average particle size less than or equal to 10 micrometers.

35. The optical device of claim 30 wherein said adhesive is an epoxy with a filler having a concentration of at least 68%, said filler being amorphous silica.

36. The optical device of claim 30 wherein said first, second, and end collimators, said pair of actuators, and said plurality of mirrors maintain an alignment relative to each other such that an optical signal passing between said first collimator and said end collimator remains at a full strength over a preselected operating temperature range.

37. The optical device of claim 30 further including a third collimator and a fourth collimator, wherein said optical bench includes two collimator through openings, wherein said first collimator, a corresponding one of said pair of actuators and said actuator mirror in said second position, said third collimator, and a corresponding two of said plurality of mirrors are positioned such there is a third optical path between said first collimator and said third collimator, and wherein said second collimator, a corresponding one of said pair of actuators and said actuator mirror in said second position, said fourth collimator, and a corresponding two of said plurality of mirrors are positioned such there is a fourth optical path between said second collimator and said fourth collimator.

* * * * *